H. PERRINS.
WHEEL FOR MOTOR AND OTHER ROAD VEHICLES.
APPLICATION FILED JAN. 27, 1909.

975,453.

Patented Nov. 15, 1910.

3 SHEETS—SHEET 1.

H. PERRINS.
WHEEL FOR MOTOR AND OTHER ROAD VEHICLES.
APPLICATION FILED JAN. 27, 1909.

975,453.

Patented Nov. 15, 1910.
3 SHEETS—SHEET 3.

Witnesses
W. P. Burke
A. F. Heuman

Inventor
Harry Perrins
by
Atty.

UNITED STATES PATENT OFFICE.

HARRY PERRINS, OF SMETHWICK, ENGLAND.

WHEEL FOR MOTOR AND OTHER ROAD VEHICLES.

975,453.  Specification of Letters Patent.  Patented Nov. 15, 1910.

Application filed January 27, 1909. Serial No. 474,505.

*To all whom it may concern:*

Be it known that I, HARRY PERRINS, a subject of His Majesty the King of Great Britain and Ireland, residing at Oakdene, Bearwood Road, Smethwick, Staffordshire, England, engineer, have invented new and useful Improvements in Wheels for Motor and other Road Vehicles, of which the following is a specification.

This invention has reference to that type of wheel for motor vehicles and for other road vehicles which is arranged to be fitted with a pneumatic tire and is formed of two stamped sheet metal disks bulged outwardly toward the hub and also at their periphery where they are fixed together at the proper distance apart by a metal ring fitting between them and secured by cross bolts said disks being gripped at the hub between a central distance block and two side flanges.

My invention consists of the herein described improved construction, combination and arrangement of the parts of a wheel of this type so as to facilitate the removal of a damaged tire and the replacing of the same by a new tire, which when the parts of the wheel are arranged in accordance with this invention, can be done very expeditiously. Moreover my said invention adds considerably to the rigidity of the wheel.

I will describe my invention by referring to the accompanying drawings on which—

Figure 1:
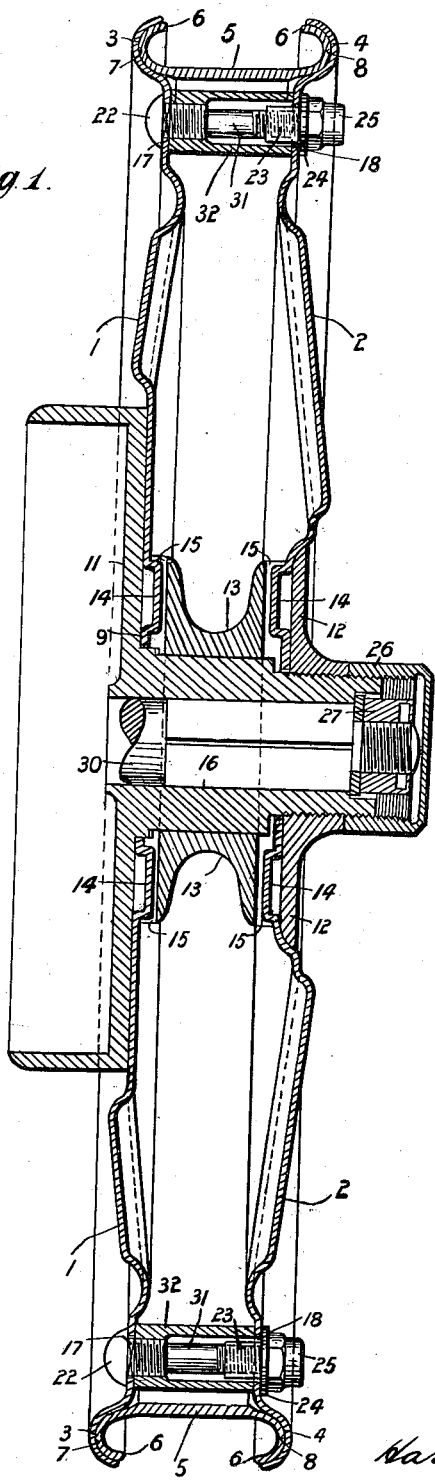
Figure 2:
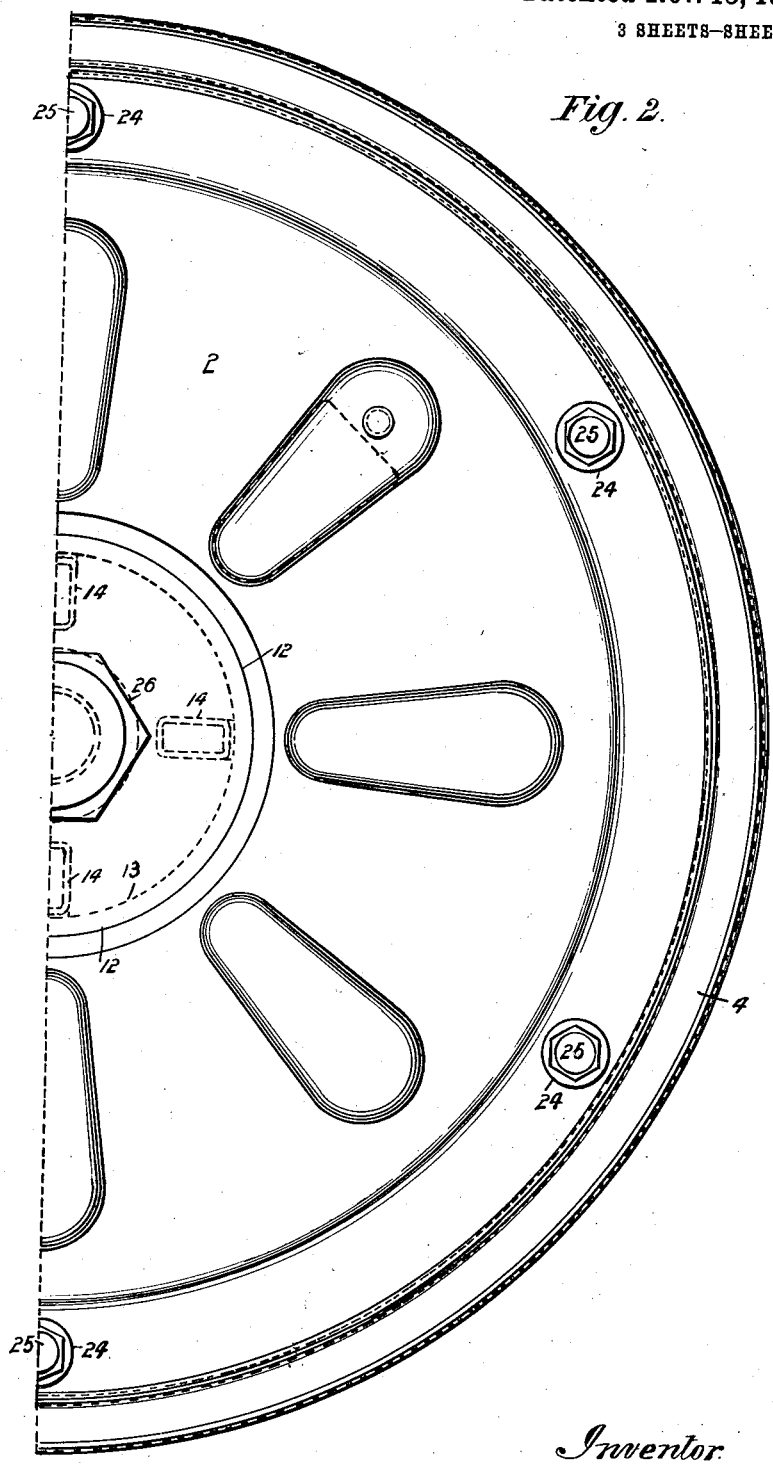
Figure 3:
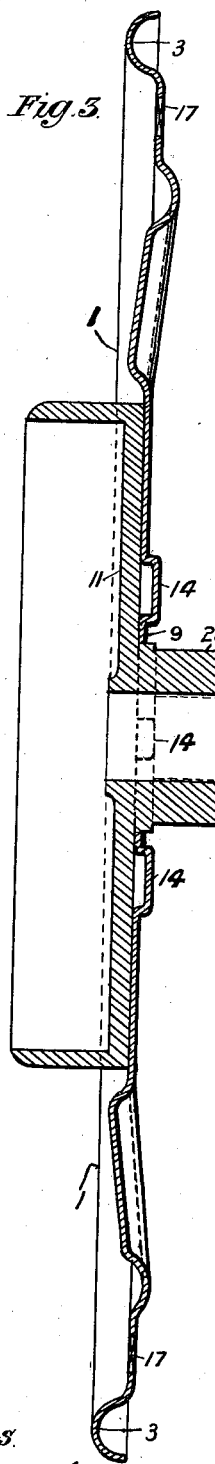
Figure 4:
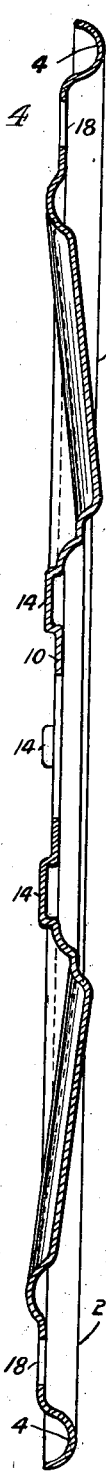
Figure 5:
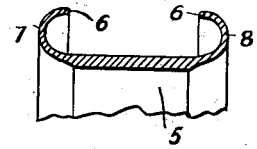
Figure 6:
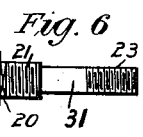
Figure 7:
Figures 8, 10:
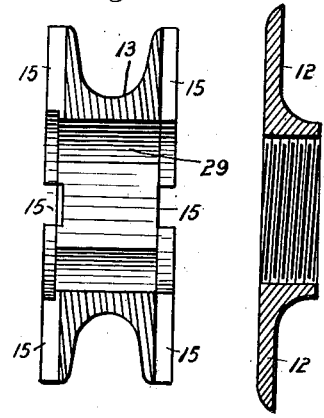
Figure 9:
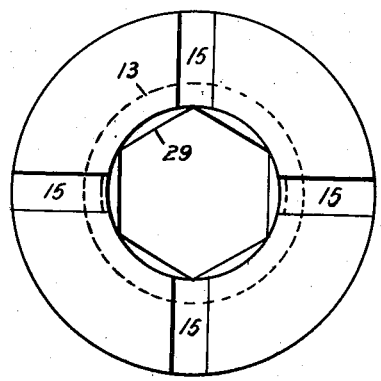

Figure 1 is a cross sectional elevation of a wheel constructed in accordance with this invention for motor and other road vehicles; Fig. 2 is a half front elevation of the same; Fig. 3 is a sectional elevation of one of the disks and the hub part of the wheel; Fig. 4 is a sectional elevation of the other disk of the wheel; Fig. 5 is a cross sectional elevation of the trough section wheel rim which I use in combination with the disks to form the wheel; Fig. 6 shows one of the cross bolts of the wheel in elevation; Fig. 7 is the nut of the screw; Fig. 8 is a sectional elevation of the distance block part of the hub; Fig. 9 is a front elevation of the said distance block; and Fig. 10 is a sectional elevation of the end disk which screws on to the hub.

In carrying out this invention the two disks 1, 2, forming the sides of the wheel are as heretofore at their peripheries turned inwardly and bulged outwardly at 3, 4, slightly within the peripheries, thereby forming an annular channel or groove 3 on the inner face of the disk 1 and a similar annular channel or groove 4 on the inner face of the disk 2 near the peripheries of these disks. The metal ring 5 which I use in combination with these two disks 1, 2, is a trough section wheel rim (shown separately in Fig. 5) made with inturned edges 6 adapted to receive the outer cover and inner air tube of the pneumatic tire and the bulged sides 7, 8, of this rim are made of the proper size to fit in and between the annular grooves 3, 4, which are stamped or otherwise formed around the peripheries of the two disks 1, 2, as aforesaid.

In order to render the wheel rigid, and particularly when the wheel is a driving wheel, the portions 9, 10 of the disks 1, 2, respectively which are gripped between the outside flanges 11, 12, of the hub and the central distance block 13, are stamped or otherwise formed with radial or other projections 14, preferably four in number, or there may be fewer or more than four projections, on the sides of the disks next to the central distance block 13 the faces of which are correspondingly grooved at 15 for these projections 14 to fit into so that when the disks 1, 2, and the central distance piece 13 are mounted on the central boss or axle box 16 of the wheel and are clamped together by the flange 12 being screwed on to the screwed end of the hub 16, the side flanges 1, 2, and the distance block 13 will be gripped firmly together and by the projections 14 of the disks fitting in the recesses 15 of the distance piece 13 it will be impossible for one disk to be turned in the smallest degree without turning the other disk also. In order to prevent the distance piece 13 and the disks 1, 2, from turning on the hub 16 the latter is on its exterior surface at 28 made hexagonal or of other shape than round, or is made round and fitted with one or more keys, and the interior of the distance piece 13 is at 29 made of corresponding shape and size so that these two parts fit together and the one is prevented from turning on the other. Any convenient number of bolts or screws such for instance as the bolts 31 are passed through holes 17, 18, in the disks and secured by nuts such as 19 and arranged as near as convenient to the rim 5 so as to clamp the grooved parts 3, 4, of the disks 1, 2, tightly against the sides 7, 8, of the ring or rim 5 which is thereby firmly and securely gripped in the grooves 3, 4, and any creeping is effectually prevented.

The bolts 31 by which the flanges 1, 2, are secured together as aforesaid are by preference made as follows:—The bolt 31 has a square neck 20 underneath its head to fit in a correspondingly shaped hole 17 in the disk 1 and there the bolt is secured by the bush 32 (Fig. 1) which is tapped at one end and is screwed on to the part 21 of the bolt 31, so as to firmly grip the disk 1 between the head 22 of the bolt and the end of the bush 32. This bush 32 is made of just the proper length to suit the distance between the disks at the holes 17, 18. The other disk 2 fits against the outer end of the bush 32 and is there secured by the nut 19 being screwed on to the screwed end 23 of the bolt 31 so as to clamp the disk 2 between the washer 24 on the bolt 31 and the outer end of the bush 32. This bush must be made of the proper length so that when the nut is screwed up as aforesaid the grooved ring 5 will be properly gripped between the sides 3, 4, of the disks 1, 2. The nut 19 is by preference made with a cap 25 to protect the end of the bolt from corrosion. Screwed on the hub at 16 outside the disk 12 there is the usual cap nut 26 which is screwed on to the end of the hub or axle box 16 to cover the nut 27 on the end of the axle 30. It will be seen that by first removing the nuts 19 from the screws 31, the disk 2 is then free to be removed and the rim 5, with the pneumatic tire inflated or deflated thereon, can be removed and replaced with another similar rim 5 and pneumatic tire if required, and this can quickly be refixed in place by replacing the disk 2 and securing it by the nuts 19 on the bolts 31 and then screwing up the disk 12 and the outside nut 26. Thus the rim 5 with a punctured tire thereon can in the space of a few minutes be removed and replaced by another rim and tire.

What I claim as my invention, and desire to secure by Letters Patent is:—

1. A stamped wheel comprising a hub, a distance piece thereon, two disks located one on each side of said piece, separating bushes at the extremities of said disks, screws passing through the bushes, the ends of the wheel flanges being turned inward, and a detachable rim gripped by and formed to the contour of the inturned flanges on the disks and adapted to support and retain a tire.

2. In a road vehicle wheel the combination of two stamped sheet metal side disks the adjacent face of each of which has a circumferential groove at or near its periphery, a central hub or axle box on which the disks are mounted furnished with one fixed and one removable flange outside said disks and a detachable distance block mounted on said hub or axle box so as not to turn thereon between said disks which latter are stamped with projections engaging in recesses in the distance block to prevent the disks turning on the hub or axle box or turning independently of one another, substantially as set forth.

In testimony whereof I have signed my name to this specification in the presence of two subscribing witnesses.

HARRY PERRINS.

Witnesses:
CHARLES BOSWORTH KETLEY,
ELIZABETH MAY DUDLEY.